United States Patent [19]
Winder

[11] Patent Number: 5,465,689
[45] Date of Patent: Nov. 14, 1995

[54] FLEA AND TICK REPELLENT BANDANNA FOR PETS

[76] Inventor: Forrest Winder, P.O. Box 1646, Santa Fe, Tex. 77510

[21] Appl. No.: 353,506

[22] Filed: Dec. 9, 1994

[51] Int. Cl.⁶ .......................... A01K 29/00; A01K 27/00
[52] U.S. Cl. .................................................. 119/861
[58] Field of Search ........................ 119/156, 860, 119/861, 856; 2/206, 207, 171.2, 171, 91; D30/144, 145, 152

[56] References Cited

U.S. PATENT DOCUMENTS

| | | | |
|---|---|---|---|
| 1,327,062 | 1/1920 | Quinn | 2/91 X |
| 3,105,970 | 10/1963 | Herzberg | 2/91 |
| 3,477,409 | 11/1969 | Costanzo | 119/860 X |
| 4,926,784 | 5/1990 | Brightful et al. | 119/860 |
| 5,058,211 | 10/1991 | Hanks | 2/206 |

*Primary Examiner*—Gene Mancene
*Assistant Examiner*—Thomas Price
*Attorney, Agent, or Firm*—Kenneth A. Roddy

[57] ABSTRACT

A bandanna for pets for repelling fleas and ticks has a porous sheath sewn into the base edge which contains a particulate flea and tick repellent in separate compartments. The preferred repellent is an herbal mixture of pennyroyal, eucalyptus, cedar, lavender, sawdust, olive oil, and oil of citronella. The sheath is formed by sealing two plies of perforated material along longitudinal side edges and at one end to form a tubular sheath. The tubular sheath is filled with the particulate repellent, the open end of the tubular sheath is sealed, and the two plies of the tubular sheath are sealed together transversely at longitudinally spaced locations along its length to form separate compartments containing the particulate repellent. The sheath is placed diagonally in the center of a square sheet of woven fabric in alignment with two diagonally opposed corners and the sheet is folded over the sheath to superpose the other two corners and form a triangular shape having a base edge with lateral apices forming lateral ends and convergent side edges which meet at an apex. The folded base edge with the sheath contained therein is folded over in a direction toward the apex with the width of the second fold being approximately the same as the width of the sheath. The folded sheet of woven fabric and the flexible sheath contained therein are then stitched together in the folded condition by stitching that penetrates the woven material and the flexible perforated sheath between the compartments.

20 Claims, 2 Drawing Sheets

FLEA AND TICK REPELLENT BANDANNA FOR PETS

BACKGROUND OF THE INVENTION

1. Field of the Invention

This invention relates generally to pet collars, and more particularly to a bandanna which encircles the neck of a pet and into which is sewn a porous sheath having compartments containing a flea and tick repellent material, preferably an herbal mixture.

2. Brief Description of the Prior Art

Flea and tick collars for pets are known wherein the collar is a thin narrow band or strap of flexible material which is impregnated with a chemical insecticide substance which emits a vapor from a solid material over a period of time. Other thin narrow strap pet collars utilize some type of compartment which usually contains a flea and tick repellent powder. Containers carrying flea and tick repellent have also been proposed for suspension about the neck of the pet.

Drehman, U.S. Pat. No. 3,978,820 discloses a conventional thin narrow strap-type pet collar which is provided with a second chemically impregnated cover strip having laces which is releasably attached by the laces to the collar.

Ramney, U.S. Pat. No. 4,068,624 discloses a thin narrow strap-type pet collar formed of rubber or plastic having preformed transverse passages into which are inserted vaporizable tablets which contain active chemical insecticides, deodorants, pesticides, germicides, or repellents.

Buzzell et al, U.S. Pat. No. 4,184,452 discloses a conventional thin narrow strap-type pet collar which is provided with snap fasteners or hoop and loop fasteners onto which a second chemically impregnated strip having mating fasteners is releasably attached. Alternatively, a chemically impregnated strip is inserted into a net on the collar. The second chemically impregnated strip can be replaced when the chemical has dispersed.

Costanzo, U.S. Pat. No. 4,208,986 discloses a conventional thin narrow strap-type pet collar which is provided with an elongate arcuate container having a hinged cover for containing deodorizing chemicals in various forms including aromatic evaporable strips or cakes saturates with liquid or jelly form chemical deodorizing or anti-flea and tick materials.

Bushman et al, U.S. Pat. Nos. 4,900,876 and 4,901,674 disclose a thin narrow strap-type pet collar made of flexible or elastic sheet material formed with a plurality of hollow compartments which hold a powdered parasiticide. The compartments have a plurality of holes or pores formed in the side walls. The normal movement of the animal when wearing the collar causes the collar to flex forcing the powdered material outwardly through the pores of the compartments.

Dunham, U.S. Pat. No. 5,109,803 discloses a chemically impregnated cover which is releasably attached to a conventional thin narrow strap-type pet collar.

Yasui, U.S. Pat. No. 5,144,913 discloses a thin narrow strap-type pet collar which has the surface contacting the animal's fur or skin is provided with an acrylic fiber and/or a nylon fiber having copper sulfide absorbed therein.

Meekins, U.S. Pat. No. 4,763,604 discloses a stuffed pet accessory in the form of a bone which may be used as a cushion or pillow against which the pet may nestle, or may be attached to a conventional narrow strap-type pet collar to resemble a bow tie. The stuffing includes an herbal mixture of four parts pennyroyal and one part rue and utilizes buckwheat hulls as a filler.

The present invention is distinguished over the prior art in general, and these patents in particular by a bandanna for pets which has a porous sheath sewn into the base edge that contains a particulate flea and tick repellent in separate compartments. The preferred repellent is an herbal mixture of pennyroyal, eucalyptus, cedar, lavender, sawdust, olive oil, and oil of citronella. The sheath is formed by sealing two plies of perforated material along longitudinal side edges and at one end to form a tubular sheath. The tubular sheath is filled with the particulate repellent, the open end of the tubular sheath is sealed, and the two plies of the tubular sheath are sealed together transversely at longitudinally spaced locations along its length to form separate compartments containing the particulate repellent. The sheath is placed diagonally in the center of a square sheet of woven fabric in alignment with two diagonally opposed corners and the sheet is folded over the sheath to superpose the other two corners and form a triangular shape having a base edge with lateral apices forming lateral ends and convergent side edges which meet at an apex. The folded base edge with the sheath contained therein is folded over in a direction toward the apex with the width of the second fold being approximately the same as the width of the sheath. The folded sheet of woven fabric and the flexible sheath contained therein are then stitched together in the folded condition by stitching that penetrates the woven material and the flexible perforated sheath between the compartments.

SUMMARY OF THE INVENTION

It is therefore an object of the present invention to provide a bandanna for pets which will repel fleas and ticks.

It is another object of this invention to provide a bandanna for pets which utilizes a particulate herbal mixture to repel fleas and ticks.

Another object of this invention is to provide a flea and tick repelling bandanna which utilizes the beneficial effects of pennyroyal, eucalyptus, cedar, lavender, olive oil, and oil of citronella to repel fleas and ticks and to eliminate odors.

Another object of this invention is to provide a bandanna for pets which is an attractive dress accessory for the pet and has the additional benefit of ridding the pet of fleas and ticks.

Another object of this invention is to provide a flea and tick repelling bandanna for pets which will surround the neck, and cover portions of the shoulder areas and extend a distance along the back of the pet, and offers greater surface area of contact than conventional narrow strap-type collars.

A further object of this invention is to provide a flea and tick repelling bandanna for pets which has a large surface area of fabric material which will become permeated with the repellent material and will be more effective than a narrow band or strap which encircles the neck.

A still further object of this invention is to provide a flea and tick repelling bandanna for pets which is simple in construction and economical to manufacture.

Other objects of the invention will become apparent from time to time throughout the specification and claims as hereinafter related.

The above noted objects and other objects of the invention are accomplished by a bandanna for pets which has a porous sheath sewn into the base edge which contains a particulate flea and tick repellent in separate compartments. The preferred repellent is an herbal mixture of pennyroyal, eucalyptus, cedar, lavender, sawdust, olive oil, and oil of citronella. The sheath is formed by sealing two plies of perforated material along longitudinal side edges and at one end to form a tubular sheath. The tubular sheath is filled with the particulate repellent, the open end of the tubular sheath is sealed, and the two plies of the tubular sheath are sealed together transversely at longitudinally spaced locations along its length to form separate compartments containing the particulate repellent. The sheath is placed diagonally in the center of a square sheet of woven fabric in alignment with two diagonally opposed corners and the sheet is folded over the sheath to superpose the other two corners and form a triangular shape having a base edge with lateral apices forming lateral ends and convergent side edges which meet at an apex. The folded base edge with the sheath contained therein is folded over in a direction toward the apex with the width of the second fold being approximately the same as the width of the sheath. The folded sheet of woven fabric and the flexible sheath contained therein are then stitched together in the folded condition by stitching that penetrates the woven material and the flexible perforated sheath between the compartments.

DESCRIPTION OF THE PREFERRED EMBODIMENT

Figure 1:
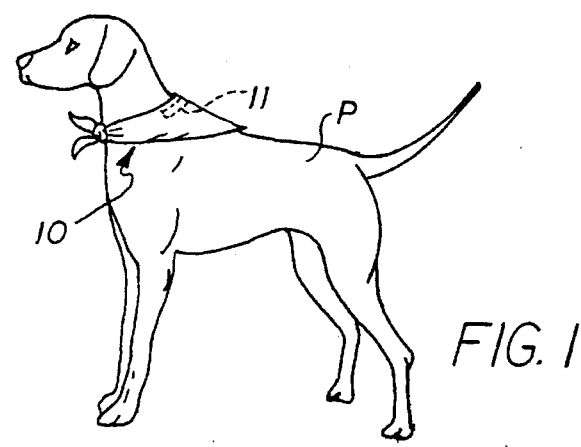
FIG. 1 is a perspective view of the flea and tick repellent bandanna in accordance with the present invention tied around the neck of a pet.

Referring to the drawings by numerals of reference, there is shown in FIG. 1, a preferred flea and tick repelling bandanna 10 tied around the neck of a pet P. A porous sheath 11 containing a particulate flea and tick repellent material for repelling fleas and ticks is sewn into the bandanna (described hereinafter).

Figure 2:
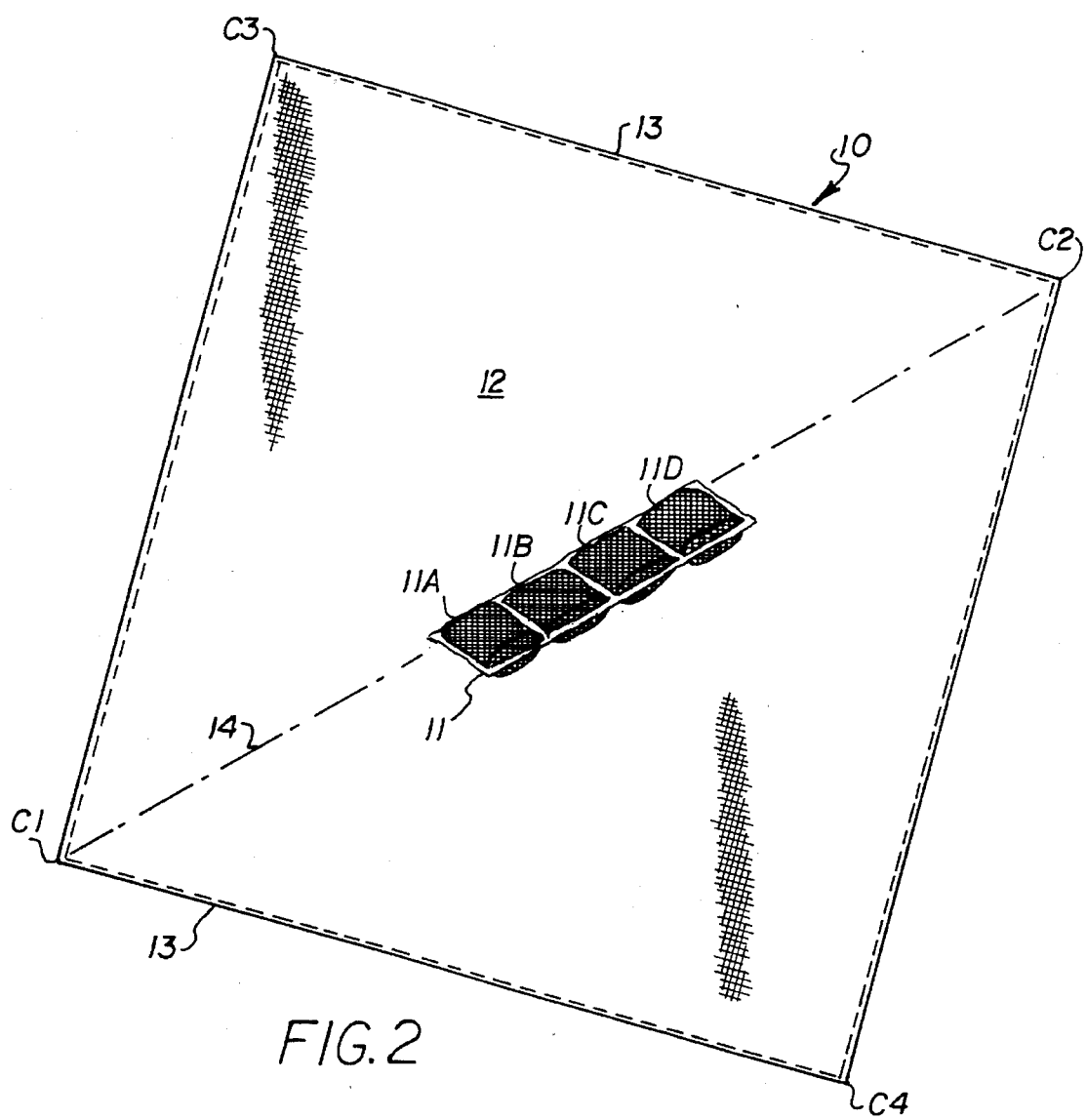
FIG. 2 is an isometric view of the flea and tick repellent bandanna in an un-assembled condition showing the sheath containing the repellent placed diagonally in the center of a square sheet of woven fabric in axial alignment with two diagonally opposed corners.

As shown in FIG. 2, the sheath 11 is an elongate rectangular pouch formed of perforated material which is divided into compartments 11A–11D along its length which contain the herbal mixture. The preferred sheath material is thin flexible non-woven perforated plastic sheet with a small mesh or pore size, such as Delnet PG 218 (tm) manufactured by Supply Technology, however other suitable materials may be used. The sheath 11 is formed by sealing two plies of the perforated material along longitudinal side edges and at one end to form a tubular sheath. The plies of the sheath are secured together by heat sealing or stitching with a suitable thread. In the preferred embodiment, the length of the sheath is approximately one-third the length between diagonal corners C1 and C2 of the bandanna. The tubular sheath is filled with the particulate repellent material from the open end.

The preferred particulate flea and tick repellent is a mixture of herbs which include; pennyroyal, eucalyptus, cedar, lavender, sawdust, olive oil, and oil of citronella. The herbs are mixed in the ratio of equal parts by weight of particulate pennyroyal, eucalyptus, cedar, lavender, and sawdust. Prior to mixing with the herbs, the sawdust is wetted with a liquid solution of 50% olive oil and 50% oil of eucalyptus in the ratio of one pint of liquid solution to 2 lbs. of sawdust and is allowed to dry.

After the sawdust has been added, the herbs and sawdust are thoroughly mixed. The tubular sheath is then filled with the particulate herbal mixture, and the open end of the tubular sheath is sealed. The particulate herbal mixture is distributed evenly along the length of the tubular sheath, and the two plies of the tubular sheath are sealed together at the open end and transversely at longitudinally spaced locations along its length by heat sealing or stitching with a suitable thread to form separate adjacent compartments 11A–11D containing the particulate herbal mixture. The illustrated example shows four compartments, however, the number may vary, depending upon the size of the bandanna.

The bandanna 10 is made from a single sheet of fabric 12 which is initially square-shaped having corners C1, C2, C3, and C4. The preferred fabric material is cotton or a cotton-polyester blend of plain weave construction. The edges of the fabric preferably have a sewn hem 13 or equivalent treatment to prevent unraveling. The sheath 11 is placed in the center of the unfolded bandanna with one longitudinal side edge in axial alignment with an imaginary line 14 extending between two diagonally opposed corners C1 and C2.

Figure 3:
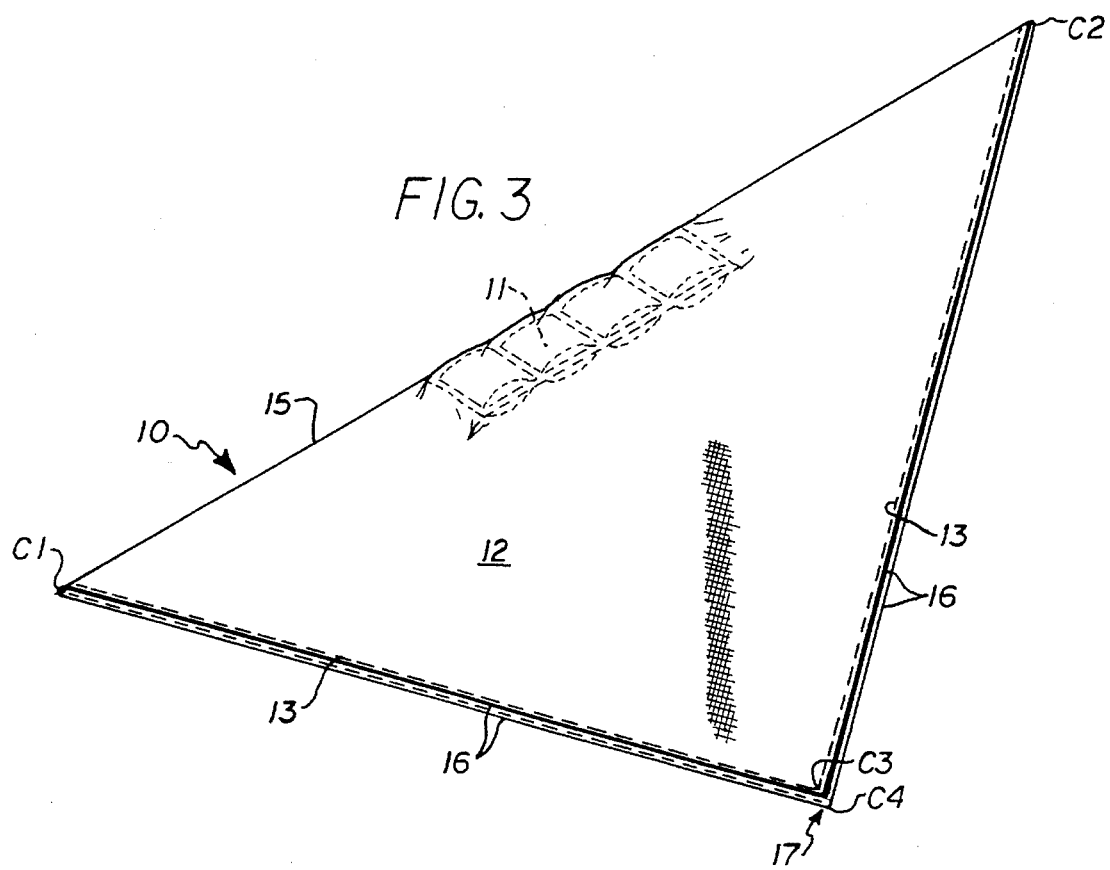
FIG. 3 is an isometric view of the flea and tick repellent bandanna showing the sheet is folded over the sheath to superpose the other two corners and form a triangular shape.

As shown in FIG. 3, the bandanna is then folded over the sheath 11 to superpose the other two corners C3 and C4 and form a triangular shape having a folded base edge 15 and convergent side edges 16 which meet at an apex 17. At this point, there is a single ply of woven fabric bandanna material on each side of the sheath.

Figure 5:
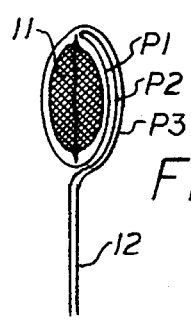
FIG. 5 is a cross section taken along line 5—5 of FIG. 4, showing the folded base edge with the sheath contained therein.
Figure 4:
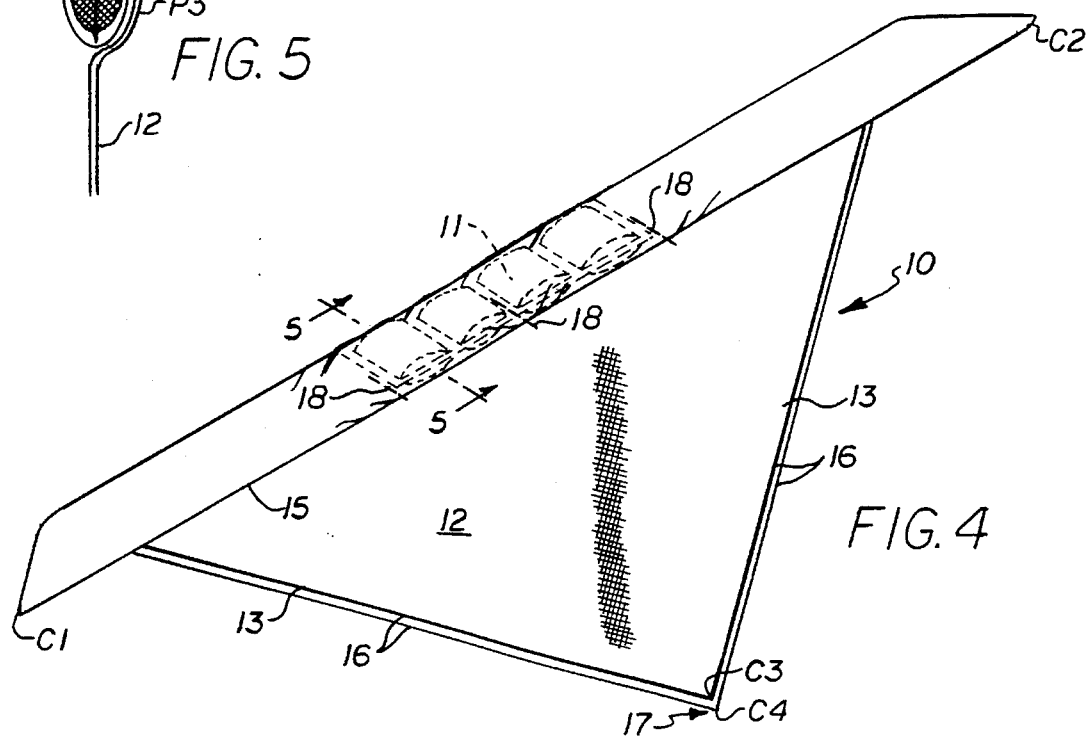
FIG. 4 is an isometric view of the flea and tick repellent bandanna showing the folded base edge with the sheath contained therein folded over in a direction toward the apex and stitched together in the folded condition.

As shown in FIGS. 4 and 5, the folded base edge 15 of the bandanna with the sheath 11 inside is then folded over in a direction toward the apex 17, with the width of the fold being approximately the same as the width of the sheath. Now the sheath 11 is enclosed in a pocket having three plies P1, P2, and P3 of woven fabric bandanna material on one side of the sheath and one ply P1 on the opposite side. The overlapped plies of the bandanna material are then sewn together with laterally spaced stitches 18 which extend perpendicular to the folded base edge 15 and are of sufficient length to also penetrate the sheath 11, to secure it into the folded pocket. The lateral spacing of the stitches 18 is such that the stitches will penetrate the sheath 11 between two adjacent compartments of the sheath. In other words, the stitches penetrate the two plies of the sheath which have been previously secured together at longitudinally spaced locations.

The side of the bandanna which has the single ply of material on one side of the sheath is to be used as the inside of the bandanna which will contact the neck of the pet, and the side having three plies of bandanna material is to be the outer side of the bandanna.

Thus, the bandanna 10 is formed into a triangular shape having convergent side edges 16 which meet at an apex 17 and the sheath 11 containing the herbal mixture is secured along approximately the center one-third of the base edge 15. The lateral portions of the bandanna on each side of the sheath 11 form lateral apices and the length of the lateral portions are sufficient to allow the bandanna to be tied around the neck of a pet. The compartments 11A-11D of the sheath maintain the herbal mixture at fixed locations around the neck of the pet to prevent the mixture from becoming grouped at the center, and facilitate the beneficial effects of the herbal mixture. When tying the bandanna around the neck of the pet, it is recommended to allow just enough room to insert two fingers between the bandanna and the pet's neck.

When the bandanna is tied around the pet's neck, the herbal mixture emits a scent which passes through the porous sheath 11 and the woven fabric bandanna material which repels fleas, ticks, and like pests from the surrounding area. The surface area of the bandanna is much greater than conventional strap-type collars and will surround the neck, and cover portions of the shoulder areas and extend a distance along the back of the pet, and after the bandanna material has been permeated with the herbal scent, it will be more effective than a narrow band which merely encircles the neck, due to its greater surface area.

In addition to the beneficial effects of the herbal mixture, the bandanna is also an attractive dress accessory for the pet.

Although the preferred bandanna embodiment has been described utilizing an herbal mixture which contains no insecticides, it should be understood that various other materials may be contained within the sheath, such as medicines, insecticides, and deodorizers, or a combination thereof.

While this invention has been described fully and completely with special emphasis upon a preferred embodiment, it should be understood that within the scope of the appended claims the invention may be practiced otherwise than as specifically described herein.

I claim:

1. A flea and tick repellent bandanna for pets comprising;

a sheet of woven material formed into a triangular shape having a base edge with lateral apices forming lateral ends and convergent side edges which meet at an apex, said base edge of sufficient length to encircle the neck of an animal when said lateral ends are tied together, and an elongate flexible porous sheath filled with a flea and tick repellent material contained within said base edge and attached thereto.

2. The bandanna according to claim 1 in which;

said flexible porous sheath is an elongate rectangular pouch formed of perforated material which is sealed along longitudinal side edges and at each end and is divided into separate compartments along its length, and said flea and tick repellent material is contained within said compartments.

3. The bandanna according to claim 2 in which;

said flexible porous sheath is secured along approximately the center one-third of said base edge.

4. The bandanna according to claim 2 in which;

said sheet of woven material is folded over said flexible porous sheath to form said base edge and said folded woven material and said flexible porous sheath are secured together in the folded condition by stitching that penetrates said woven material and said flexible porous sheath between said compartments.

5. The bandanna according to claim 4 in which;

said sheet of woven material is folded over said flexible porous sheath to form three plies of woven material on one side of said flexible porous sheath and one ply on an opposite side.

6. The bandanna according to claim 2 in which;

said flexible porous sheath is formed of perforated plastic sheet material.

7. The bandanna according to claim 6 in which;

said flexible porous sheath is heat sealed along longitudinal side edges and at each end and is heat sealed transversely at longitudinally spaced locations along its length to form said separate compartments.

8. An herbal bandanna for pets comprising;

a sheet of woven material formed into a triangular shape having a base edge with lateral apices forming lateral ends and convergent side edges which meet at an apex, said base edge of sufficient length to encircle the neck of an animal when said lateral ends are tied together, and an elongate flexible porous sheath filled with a particulate herbal mixture contained within said base edge.

9. The herbal bandanna according to claim 8 in which;

said flexible porous sheath is an elongate rectangular pouch formed of perforated material which is sealed along longitudinal side edges and at each end and is divided into separate compartments along its length, and said particulate herbal mixture is contained within said compartments.

10. The herbal bandanna according to claim 9 in which;

said flexible porous sheath is secured along approximately the center one-third of said base edge.

11. The herbal bandanna according to claim 9 in which;

said sheet of woven material is folded over said flexible porous sheath to form said base edge and said folded woven material and said flexible porous sheath are secured together in the folded condition by stitching that penetrates said woven material and said flexible porous sheath between said compartments.

12. The herbal bandanna according to claim 11 in which;

said sheet of woven material is folded over said flexible porous sheath to form three plies of woven material on one side of said flexible porous sheath and one ply on an opposite side.

13. The herbal bandanna according to claim 9 in which;

said flexible porous sheath is formed of perforated plastic sheet material.

14. The herbal bandanna according to claim 13 in which;

said flexible porous sheath is heat sealed along longitudinal side edges and at each end and is heat sealed transversely at longitudinally spaced locations along its length to form said separate compartments.

15. The herbal bandanna according to claim 8 in which;

said particulate herbal mixture comprises a mixture of pennyroyal, eucalyptus, cedar, lavender, sawdust, olive oil, and oil of citronella.

16. The herbal bandanna according to claim 15 in which;

said particulate herbal mixture is mixed in the ratio of equal parts by weight of pennyroyal, eucalyptus, cedar, lavender, and sawdust, said sawdust saturated with a liquid solution of 50% olive oil and 50% oil of eucalyptus in the ratio of one pint of said liquid solution to 2 lbs. of sawdust.

17. A method of making a flea and tick repellent bandanna for pets comprising;

providing a single square sheet of woven fabric, providing an elongate, generally rectangular, flexible porous sheath having a flea and tick repellent material contained therein within compartments.

placing said flexible porous sheath diagonally in the center of said square sheet of woven fabric in axial alignment with two laterally opposed corners, folding said square sheet of woven fabric over said sheath to superpose the other two corners and form a triangular shape having a folded base edge with lateral apices forming lateral ends and convergent side edges which meet at an apex with said sheath being contained within said folded base edge, stitching said folded sheet of woven fabric and said flexible porous sheath contained therein together in the folded condition by stitching that penetrates said woven material and said flexible porous sheath between said compartments.

18. The method according to claim 17 wherein said step of folding said square sheet of woven fabric over said sheath includes the step of;

after folding said square sheet of woven fabric over said sheath and prior to said step of stitching, folding said folded base edge of said sheet of woven fabric with said sheath contained therein over in a direction toward said apex with the width of the second fold being approximately the same as the width of said sheath.

19. The method according to claim 17 wherein said step of providing said elongate, generally rectangular, flexible porous sheath comprises the steps of;

sealing two plies of porous material along longitudinal side edges and at one end to form a tubular sheath, filling said tubular sheath with a flea and tick repellent material, sealing the open end of said tubular sheath, distributing the flea and tick repellent material evenly along the length of said tubular sheath, and sealing the two plies of said tubular sheath together transversely at longitudinally spaced locations along its length to form separate compartments containing said flea and tick repellent material.

20. The method according to claim 19 in which said flea and tick repellent material is a particulate herbal mixture, and said method includes the step of;

prior to filling said tubular sheath with said flea and tick repellent material, mixing sawdust with a liquid solution of 50% olive oil and 50% oil of eucalyptus in the ratio of one pint of liquid solution to 2 lbs. of sawdust and allowing it to dry, thoroughly mixing the dried sawdust mixture together with equal parts by weight of pennyroyal, eucalyptus, cedar, and lavender, and thereafter filling said tubular sheath with the particulate herbal mixture.

\* \* \* \* \*